US 12,132,854 B2

(12) United States Patent
Bandameedipalli et al.

(10) Patent No.: US 12,132,854 B2
(45) Date of Patent: Oct. 29, 2024

(54) ELECTRONIC DEVICES, METHODS, AND SYSTEMS FOR RESTRICTING NON-ESSENTIAL SERVICES FROM FOREGROUND APPLICATIONS

(71) Applicant: Motorola Mobility LLC, Chicago, IL (US)

(72) Inventors: Jyothsna Bandameedipalli, Bangalore (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 431 days.

(21) Appl. No.: 17/561,893

(22) Filed: Dec. 24, 2021

(65) Prior Publication Data

US 2023/0208964 A1 Jun. 29, 2023

(51) Int. Cl.
*H04M 1/72463* (2021.01)
*G06F 1/3212* (2019.01)
*G06F 9/48* (2006.01)
*H04M 1/72454* (2021.01)
*H04M 1/72457* (2021.01)

(52) U.S. Cl.
CPC ...... *H04M 1/72463* (2021.01); *G06F 1/3212* (2013.01); *G06F 9/4862* (2013.01); *H04M 1/72454* (2021.01); *H04M 1/72457* (2021.01)

(58) Field of Classification Search
CPC ......... H04M 1/72463; H04M 1/72454; H04M 1/72457; H04M 1/2442; H04M 1/7243; G06F 1/3212; G06F 1/3206; G06F 1/3234; G06F 1/3287; G06F 9/4862; G06F 9/4893
See application file for complete search history.

(56) References Cited

U.S. PATENT DOCUMENTS

| 2011/0238466 A1* | 9/2011 | Haumont | G06Q 30/02 705/14.4 |
| 2015/0293575 A1* | 10/2015 | Hampson | G06F 1/329 713/323 |
| 2018/0364786 A1* | 12/2018 | de la Cropte de Chanterac | G06F 1/329 |

OTHER PUBLICATIONS

"Power Management", Android Open Source Project; Unknown Publication Date but prior to filing of present application; Reviewed online Nov. 16, 2021 at https://source.android.com/devices/tech/power/mgmt.

(Continued)

*Primary Examiner* — Farid Seyedvosoghi
(74) *Attorney, Agent, or Firm* — Philip H. Burrus, IV

(57) ABSTRACT

An electronic device includes one or more sensors detecting an energy storage level of an energy storage device falling below a predefined threshold. A location detector and a motion detector determine whether the electronic device is positioned at a location trusted by an authorized user or whether the electronic device is being transported by a mode of transport trusted by the authorized user. The one or more processors identify foreground applications operating on the electronic device and non-essential services associated with the foreground applications. The one or more processors restrict the non-essential services from occurring when the energy storage level of the energy storage device is below the predefined threshold unless the electronic device is positioned at the trusted location or is being transported by the trusted mode of transport.

20 Claims, 7 Drawing Sheets

(56) References Cited

OTHER PUBLICATIONS

"Power Management Restrictions—Android Developers", Android Developer; Unknown publication date but prior to filing of present application; Reviewed online at https://developer.android.com/topic/performance/power/power-details.

* cited by examiner

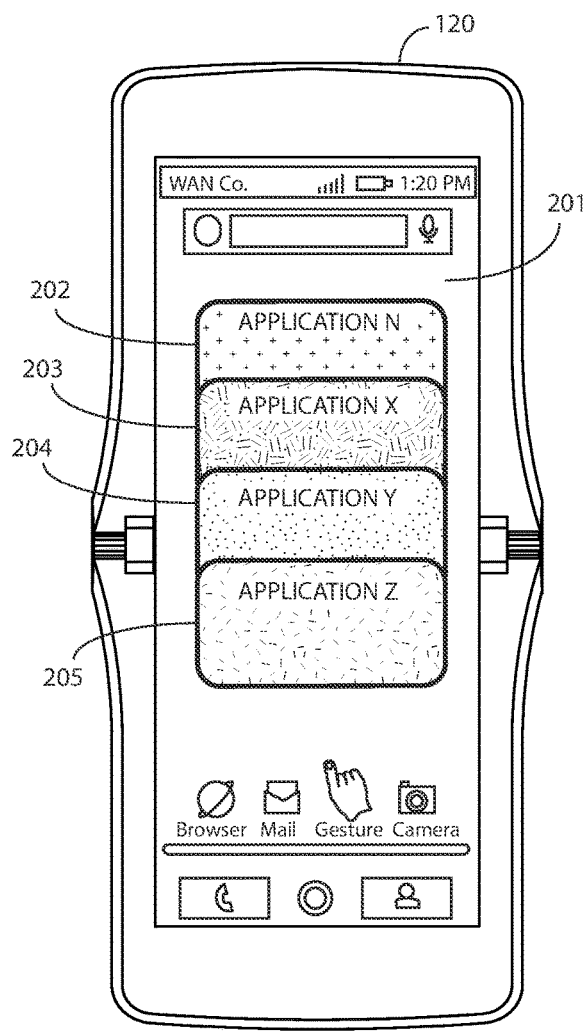 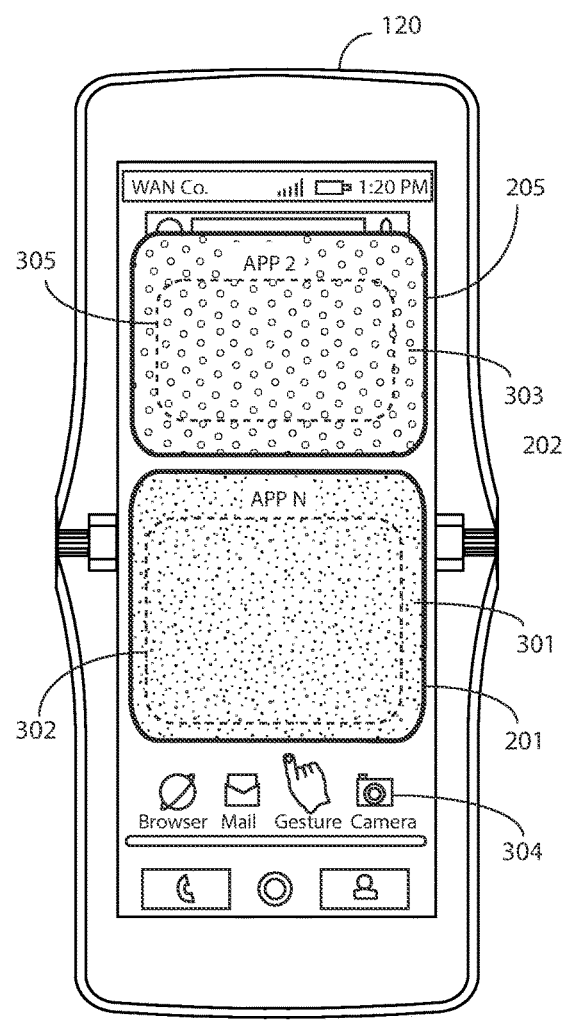
*FIG. 2*   *FIG. 3*

ELECTRONIC DEVICES, METHODS, AND SYSTEMS FOR RESTRICTING NON-ESSENTIAL SERVICES FROM FOREGROUND APPLICATIONS

BACKGROUND

Technical Field

This disclosure relates generally to electronic devices, and more particularly to electronic devices having one or more processors capable of operating one or more applications both in foreground and background operating modes.

Background Art

Modern portable electronic devices often have the computing power on par with the desktop computers of only a few years ago. Modern electronic devices such as smartphones are equipped with powerful processors, high-resolution displays, powerful loudspeakers, and extremely fast communication circuits. Such devices include the processing power to run multiple applications, or "apps," both in a foreground mode occurring when a user is actively interacting with the application, and in a background mode occurring when the application is actively running but is not being actively engaged by a user. It would be advantageous to have improved systems, devices, and methods for managing the services associated with these applications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 2 illustrates one or more applications operating in a background mode in accordance with one or more embodiments of the disclosure.

FIG. 3 illustrates one or more applications operating in a foreground mode in accordance with one or more embodiments of the disclosure.

Figure 1:
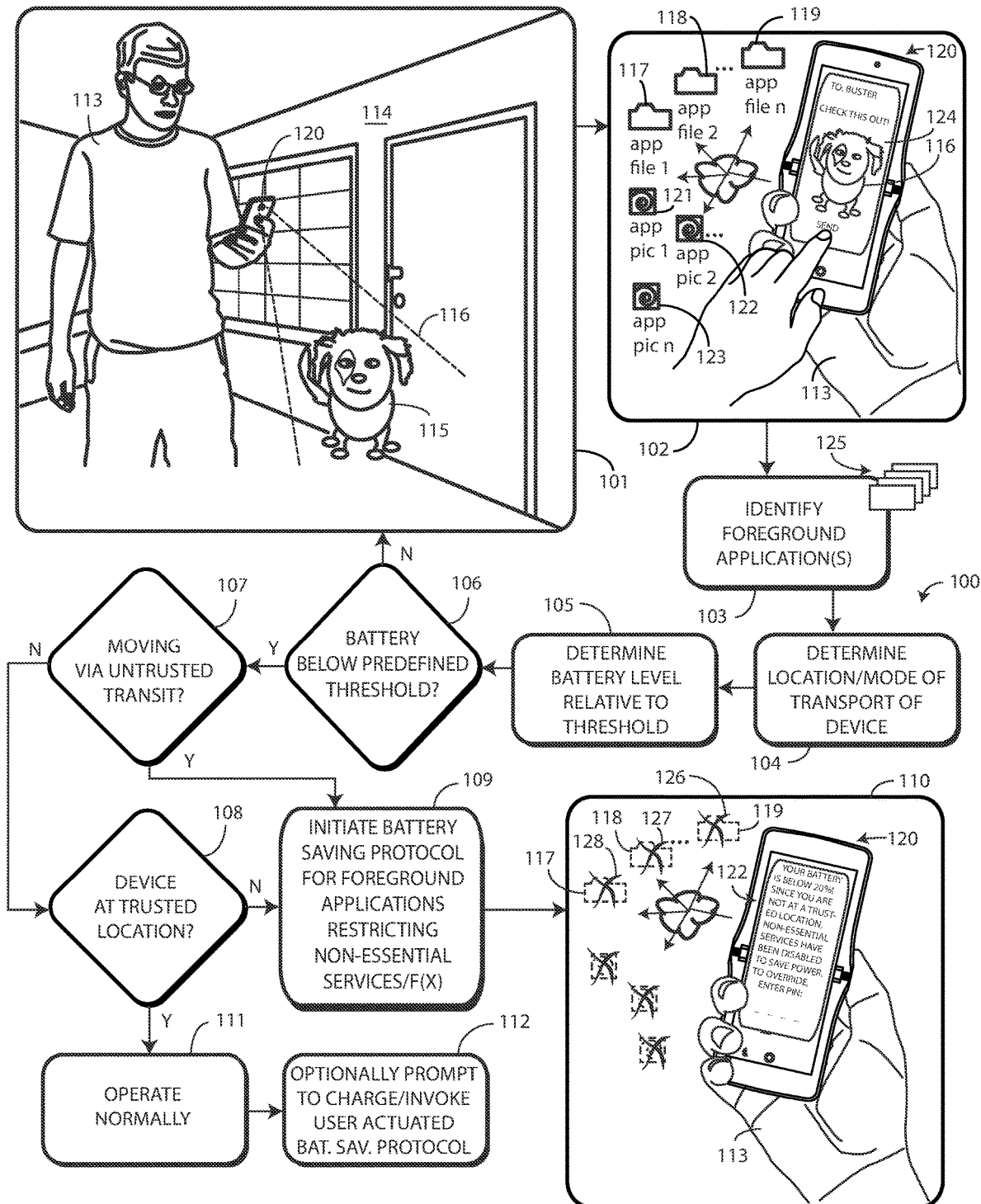
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to restricting one or more non-essential services from occurring when an energy storage level of an energy storage device is below a predetermined threshold, unless the electronic device is positioned at a location trusted by an authorized user of the electronic device or is being transported by a mode of transport trusted by the authorized user of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of restricting, in response to a location detector falling to determine the electronic device is in a location trusted by the authorized user when a power manager of the electronic device determines the energy storage level of an energy storage device is below a predefined threshold, one or more non-essential services of one or more foreground applications operating on one or more processors of the electronic device. The non-processor circuits may include, but are not limited to, a radio receiver, a radio transmitter, signal drivers, clock circuits, power source circuits, and user input devices.

As such, these functions may be interpreted as steps of a method to perform the restriction, in response to a motion detector falling to determine the electronic device is being transported by a mode of transportation trusted by the authorized user when the power manager determines whether the energy storage level of the energy storage device is below the predetermined threshold, one or more non-essential services of one or more foreground applications operating on the one or more processors. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, modern portable electronic devices such as smartphones, tablet computers, and even laptop computers include the processing power to run multiple applications both in a foreground mode occurring when a user is actively interacting with the application and in a background mode occurring when the application is actively running but is not being actively engaged by a user. Embodiments of the disclosure contemplate that many applications operable on smartphones and other devices include services that execute in tandem regardless of whether a user's interaction requires resources from a particular service. Videos and images may be downloaded by a download service of an application, for example, despite the fact that a user is only using the application to read text. This can lead to problems when energy storage levels in batteries of these devices begin to run low.

While there are numerous power saving techniques to conserve the energy storage level of an energy storage device, they are not applicable to foreground applications. While background applications may be restricted or terminated, and while device features may be limited when the energy in an energy storage device is low, there has historically been a presumption that the user of the device is aware of the status of the battery when interacting with a foreground application.

Embodiments of the disclosure contemplate that when users are interacting with a foreground application some unintended functionality will automatically execute via services of the foreground application. Such functionality occurs despite any prior art battery saver mode being enabled. One example of such a function includes the automatic downloading of messages and media in messaging applications. This automatic downloading, which allows a user to view the messages and media at a later time without downloading delays, generally occurs independently of any consideration of energy storage levels in an energy storage device. Other examples of such functions include the automatic playback of videos in messaging and multimedia applications, the automatic delivery of advertisements in games, multimedia applications, web browsers, and other similar applications, and so forth. These examples are illustrative only, as other examples will be obvious to those of ordinary skill in the art having the benefit of this disclosure.

Advantageously, embodiments of the disclosure provide a solution to this problem. In one or more embodiments, one or more sensors of an electronic device detect an energy storage level of an energy storage device powering the electronic device falling below a predefined threshold. A location detector and a motion detector then determine whether the electronic device is positioned at a location trusted by an authorized user of the electronic device when the energy storage level of the energy storage device is below the predefined threshold or the electronic device is being transported by a mode of transport trusted by the authorized user of the electronic device when the energy storage level of the energy storage device is below the predefined threshold.

One or more processors then identify one or more foreground applications operating on the electronic device. The one or more processors also identify one or more non-essential services associated with the one or more foreground applications operating on the electronic device. In one or more embodiments, the one or more processors restrict the one or more non-essential services from occurring when the energy storage level of the energy storage device is below the predefined threshold unless the electronic device is positioned at the location trusted by the authorized user of the electronic device or is being transported by the mode of transport trusted by the authorized user of the electronic device.

To illustrate by way of example, one or more processors of an electronic device can determine whether the electronic device is in a known location such as the home of an authorized user or a place of employment of the authorized user. This information can be of value due to the fact that the probability that the authorized user of the electronic device has a charger situated at a trusted location such as home or work is higher than when the authorized user is at a random, temporary, or infrequently visited location such as a restaurant.

The one or more processors thus determine if the electronic device is situated in a known or unknown location when a power manager determines that the energy storage level of the energy storage device falls below a predetermined threshold. When the electronic device is situated at an unknown location and the battery level is low, the one or more processors can then restrict operations of foreground applications to save the remaining energy storage level for only the performance of essential services, thereby taking all possible measures to extend battery life due to the fact that the probability of the authorized user having a charger is lower in such unknown locations.

One or more motion detectors can also determine if the electronic device is in transit. This information can be of value as well due to the fact that the probability that the authorized user of the electronic device has a charger situated within a trusted mode of transit such as their personal car is higher than when the authorized user is traveling by an untrusted mode of transit such as a public bus or train. Similarly, if the authorized user of the electronic device is walking, it is almost entirely unlikely that they will have a charger, power source, and time available to charge the energy storage device of the electronic device. If the authorized user is transporting the electronic device using, for example, a public or unknown transport facility, the probability of the authorized user having a charger—and power source—is lower in such unknown transit operations.

In one or more embodiments, one or more processors of the electronic device determine, when the electronic device is in an untrusted location or is being transported by an untrusted mode of transit, that the energy storage level of an energy storage device powering the electronic device has fallen below a predetermined threshold, one example of which is twenty percent of the maximum energy storage capacity of the energy storage device. Based upon this multi-point determination, namely, that the energy storage level of the energy storage device is below the predetermined threshold, combined with the fact that the electronic device is not at a trusted location or being transported by a trusted mode of transit, the one or more processors can initiate a battery saving protocol in running foreground applications where in specific functionalities and/or services which are considered to be essential services are allowed to run. By contrast, services which are considered as non-essential and/or desired are restricted.

In one or more embodiments, the determination that a service is "non-essential" is derived from the fact that the service being performed fails to yield resources that are immediately required by an authorized user of the electronic device. Examples of such non-essential services include the automatic download of media contents for a foreground application, automatic playback options for media contents of foreground applications, parts of which are automatically streamed from the cloud, caller identification services that require cloud-based interactions, optional content rendering in foreground applications, in-application or in-media advertisements being presented in foreground applications, and so forth. Other examples of non-essential services will be described below. Still others will be obvious to those of ordinary skill in the art having the benefit of this disclosure.

Such a foreground application, service restricting, energy saving mechanism is especially beneficial for modern electronic devices due to the fact that so many applications now involve communication with one or more services across a network. These "cloud-based" applications frequently receive user input locally at the electronic device, transmit that user input to the cloud for processing, and receive results of the processing from the cloud for presentation to a user of the device. While these cloud-based applications are quite popular due to the enhanced user experience they provide with lower memory requirements and on less sophisticated processors, they can be power hungry. The fact that cloud-based resources are used makes it difficult for device policies to simply turn OFF data services when the energy storage level in an energy storage device runs low.

Advantageously, embodiments of the disclosure automatically distinguish between essential services and non-essential services to restrict the non-essential services when the energy storage level of an energy storage device drops below a predetermined threshold. Embodiments of the disclosure do this primarily in foreground applications that are currently being used by a user. Moreover, embodiments of the disclosure provide the restriction only when the electronic device is situated at an untrusted or unknown location or is being transported by an unknown mode to transit, to limit the times in which any services of foreground applications are restricted.

In one or more embodiments, an electronic device comprises an energy storage device powering the electronic device. The electronic device also includes a power manager determining whether an energy storage level of the energy storage device is below a predefined threshold.

A location detector determines whether the electronic device is in a location trusted by an authorized user of the electronic device when the power manager determines the energy storage level to be below the predefined threshold. One or more processors then restrict, in response to the location detector failing to determine the electronic device is in the location trusted by the authorized user when the power manger determines whether the energy storage level of the energy storage device is below the predefined threshold, one or more non-essential services of one or more foreground applications operating on the one or more processors.

When the electronic device includes a display, the one or more non-essential services can include automatic downloading of media content for user interactive areas of the one or more foreground applications other than a user interactive area being presented on the display. Alternatively, the one or more non-essential services can include downloads of media content from a cloud server across a network. Other examples will be provided below. Still others will be obvious to those of ordinary skill in the art having the benefit of this disclosure. In one or more embodiments, the one or more processors then cease any restriction of the non-essential services when the electronic device becomes situated at the location trusted by the authorized user of the electronic device. Advantageously, embodiments of the disclosure work to extend battery life by restricting operations of foreground applications that are not essential but that are generally executed automatically anyway.

Turning now to FIG. 1, illustrated therein is one explanatory method 100 suitable for execution in an electronic device 120 in accordance with one or more embodiments of the disclosure. Beginning at step 101, an authorized user 113 is shown holding an electronic device 120 configured in accordance with one or more embodiments of the disclosure. The authorized user 113 is situated at a veterinary office 114 with his pet dog 115, who needs to go on a diet. Given that the authorized user 113 of the electronic device 120 hopes for his dog 115 to be much slimmer and more svelte after transitioning to a new kibble prescribed by a board-certified veterinary nutritionist, the authorized user 113 wants to take a few "before" images 116 so that he can use before and after pictures on the holiday greeting cards he sends to family and friends.

The veterinary office 114 is not considered to be a "known" or a "trusted" location because the authorized user 113 of the electronic device 120 infrequently visits the veterinary office 114. Additionally, even when doing so, the authorized user 113 of the electronic device 120 stays in the veterinary office 114 for only a relatively short period of time. Accordingly, embodiments of the disclosure contemplate that the probability that the authorized user 113 of the electronic device 120 has a charger handy while at the veterinary office 114 is reasonably low, and consider this not to be a known or trusted location. This is in contrast to locations considered to be known or trusted locations, such as the location of residence of the authorized user 113 of the electronic device 120, which may be a home or other dwelling (e.g., his house) situated at a residence belonging to the authorized user 113.

Figure 8:
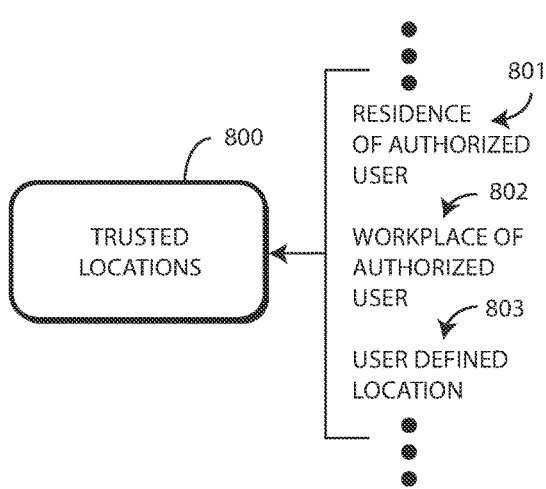
FIG. 8 illustrates examples of one or more trusted locations in accordance with one or more embodiments of the disclosure.

Turning briefly now to FIG. 8, illustrated therein are a few examples of trusted locations 800 as the term is used in the context of this disclosure. These examples are illustrative only, as others will be obvious to those of ordinary skill in the art having the benefit of this disclosure.

A first example of a trusted location 800 is a residence 801 of the authorized user (113). Embodiments of the disclosure contemplate that the authorized user (113) of an electronic device (120) will almost always have a charger, power source, and time to charge the energy storage device of an electronic device (120) when at home. Consequently, the residence 801 of the authorized user (113) of the electronic device (120) is considered to be a trusted location 800.

A second example of a trusted location 800 is a workplace 802 where the authorized user (113) of the electronic device (120) is employed. Since people spend long periods of time at work, frequently using devices such as the electronic device (120) of FIG. 1 to communicate with co-workers, embodiments of the disclosure contemplate that it is highly likely that the authorized user (113) of the electronic device (120) will have some type of charging device—perhaps provided by their employer—to charge the energy storage device powering the electronic device (120). Consequently, the workplace 802 where the authorized user (113) of the electronic device (120) is employed is considered to be a trusted location as well.

Embodiments of the disclosure contemplate that the authorized user (113) of the electronic device (120) may also want to specifically define locations in which a charger, a power source, and potentially sufficient amounts of time will be available to charge the energy storage device powering the electronic device (120). Consequently, embodiments of the disclosure allow for user-defined locations 803 to be trusted locations 800 as well. If, for example, the authorized user (113) of the electronic device (120) is a frequent traveler, they may define any major airport as a trusted location due to the fact that they routinely carry a charger with them when traveling, and further often have access to a wall outlet in an airport with plenty of time while waiting for connecting flights to charge the energy storage device powering the electronic device (120). Consequently, using a menu or other controls of the electronic device (120) a user-defined location 803 can be a trusted location 800 as well.

Turning now back to FIG. 1, and to illustrate the distinction between known and/or trusted locations and other types of locations, in one or more embodiments one or more processors of the electronic device 120 can determine whether the electronic device 120 is in a known location such as the home of the authorized user 113 or a place of employment of the authorized user 113. As noted above, when the authorized user 113 is in a trusted location (800) the probability that the authorized user 113 of the electronic device 120 has access to a charger is higher than when the authorized user is at a random location such as a restaurant. Thus, while "trusted" and "known" are used to refer to places in which the authorized user 113 of the electronic device 120 spends considerable amounts of time and is likely to have gear stored there, for the purposes of this disclosure "known" and "trusted" locations refer to locations sufficiently occupied by the authorized user 113 of the electronic device 120 for sufficient amounts of time that the authorized user 113 is likely to have access to a charger, a power source, and time sufficient to recharge a battery or other energy storage device powering the electronic device 120.

By contrast, locations that are not trusted, known, or otherwise similarly classified are considered to be locations that are not occupied by the authorized user 113 of the electronic device 120 for sufficient amounts of time that the authorized user 113 is likely to have access to a charger, a power source, and time sufficient to recharge a battery or other energy storage device powering the electronic device 120. Given that the authorized user 113 of the electronic device 120 is only at the veterinary office 114 to have his dog 115 examined and to pick up some "healthy weight" kibble, it is unlikely that—of the battery or other energy storage device powering the electronic device 120 died—the authorized user 113 would have access to a charger, outlet, and/or time to recharge the same.

Figure 4:
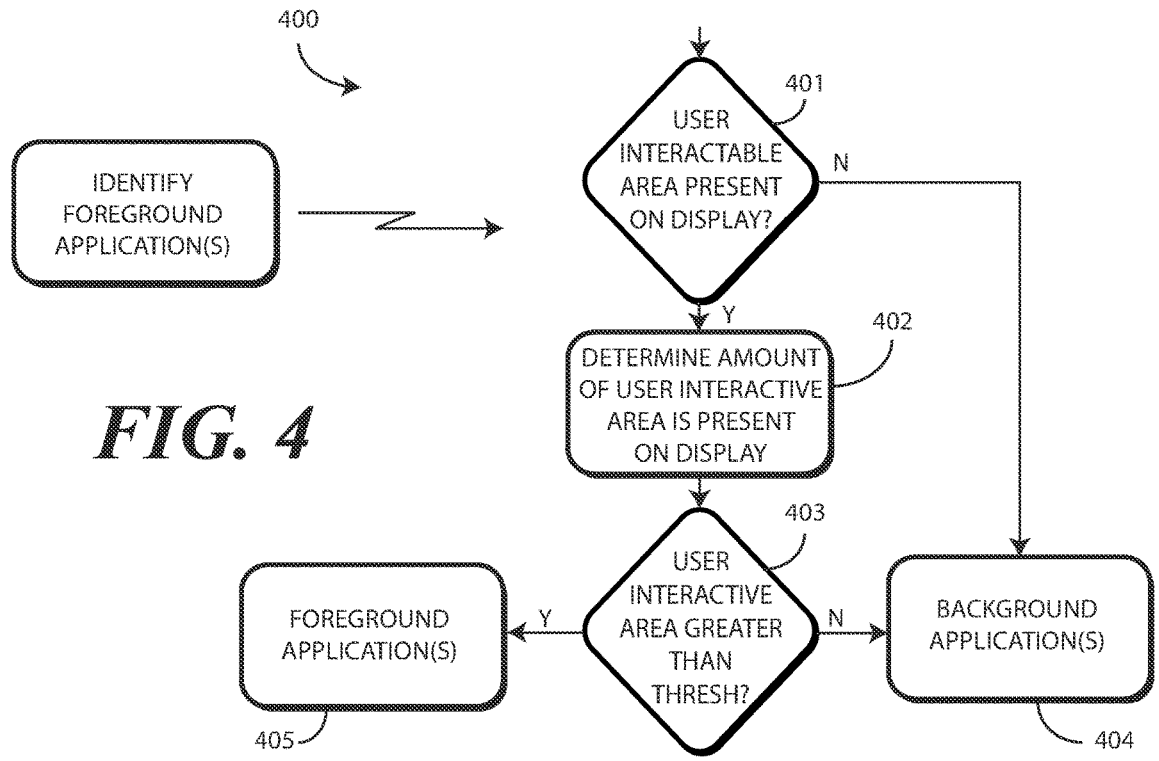
FIG. 4 illustrates one or more method steps in accordance with one or more embodiments of the disclosure.

At step 102, one or more processors of the electronic device 120 identify one or more foreground applications 117,118,119 operating on the electronic device 120. Turning briefly to FIG. 4, illustrated therein is one explanatory method 400 illustrating how this can occur.

Beginning at decision 401, the one or more processors of the electronic device (120) can determine whether any user interactive areas of an application are being presented on the display. Embodiments of the disclosure contemplate that for an application to be classified as a "foreground" application, a user must have access to interact with the application. Consequently, if there is no user interactive area present on the display an application is classified as a background application at step 404.

At step 402, the one or more processors of the electronic device (120) determine whether a sufficient amount of the user interactive area is present on the display of the electronic device (120). Embodiments of the disclosure contemplate that applications can be minimized or otherwise deprioritized while still leaving a thumbnail or icon-shaped user interaction area on the display. Accordingly, step 402 determines whether the user interactive area occupies a sufficient amount of area across the display or other user interface of the electronic device (120). Decision 404 determines whether this amount of area occupied by the user interactive area exceeds a predefined threshold, one example of which is at least one square inch. If so, the application is classified as a foreground application at step 405. Otherwise, the application is classified as a background application at step 404.

Turning now back to FIG. 1, as noted above, modern portable electronic devices such as smartphones, tablet computers, and even laptop computers include the processing power to run multiple applications both in a foreground mode occurring when a user is actively interacting with the application and in a background mode occurring when the application is actively running but is not being actively engaged by a user. Examples of both foreground applications 117,118,119 and background applications 121,122,123 are shown at step 102.

In this example, foreground application 117 comprises an image capture application, while foreground application 118 comprises a messaging application. Foreground application 119 comprises an audio capture application. Each is a "foreground" application because the authorized user 113 of the electronic device 120 is actively interacting with each of these foreground applications 117,118,119. The authorized user 113 of the electronic device 120 is capturing an image 116 of his dog 115, is inserting that image 116 into a message 124 to send to a friend, and is dictating the text, "Check this out," using the audio capture application. Since the authorized user 113 is actively interacting with each of these applications, namely, the image capture application, the messaging application, and the audio capture application, each constitutes a "foreground" application.

By contrast, background application 121 is a newsreader application. Background application 122 is a video application, and background application 123 is a voice telephone call application. The authorized user 113 of the electronic device 120 is interacting with none of these applications. Instead, they are simply running on the one or more processors of the electronic device 120 in the background.

Turning briefly to FIGS. 2 and 3, the distinction between foreground applications and background applications is further illustrated in a different manner. Beginning with FIG. 2, using a three-finger up-swipe gesture on the display of the electronic device 120, the operational applications 202,203, 204,205 are revealed. By selecting one or more of these applications 202,203,204,205, the user can cause it to become an active application. Alternatively, by swiping one or more of these applications 202,203,204,205, a user can cause the swiped application to terminate. Note that there are four applications 202,203,204,205 running on the one or more processors of the electronic device 120 in FIG. 2. Each of these constitutes an "operational" application operating on one or more processors of the electronic device 120. If a user were to launch another application, it would be added to the mix with these applications 202,203,204,205 as another operational application.

Turning now to FIG. 3, a user has selected application 202 and application 205 to become foreground applications. These applications 202,205 are foreground applications because they are active on the one or more processors of the electronic device 120, are present on the display 201 of the electronic device 120 and include a user interactable area 302,305 available on the user interface of the electronic device 120 with which a user can deliver user input to interact with the application 202,205. This results in application (203) and application (204) being transitioned to background applications since they have no user interactable area present on the user interface of the electronic device 120. To the contrary, to make application (203) or application (204) an active application, a user would need to return to the list shown in FIG. 2 and select those applications (203,204) (or take similar measures) to transition them from background applications to foreground applications.

Accordingly, in one or more embodiments one or more processors of the electronic device 120 can identify application 202 and application 205 as foreground applications by determining whether a user interactable area 302,305 associated with each application 202,205 is available on a user interface of the electronic device 120. In one or more embodiments, the one or more processors of the electronic device 120 only identify application 202 and application 205 as foreground applications when the user interactable area 302,305 of each application 202,205 exceeds a predefined area 301,303 of the user interface (here display 201) of the electronic device 120. Embodiments of the disclosure contemplate that applications can be configured as icons 304 that, when actively operating on the one or more processors of the electronic device 120 as background applications and touched, cause the corresponding application to become a foreground application. However, such icons 304 are very small and fail to provide sufficient area for meaningful interaction with the underlying application. Accordingly, in one or more embodiments the one or more processors of the electronic device 120 only identify application 202 and application 205 as foreground applications when the user interactable area 302,305 of each application 202,205 exceeds a predefined area 301,303 of the user interface of the electronic device 120. Other techniques for identifying foreground applications will be obvious to those of ordinary skill in the art having the benefit of this disclosure.

Turning now back to FIG. 1, at step 103 the one or more processors of the electronic device identify one or more foreground applications 125 operating on the electronic device. At step 104, a location detector determines whether the electronic device 120 is positioned at a location trusted by the authorized user 113 of the electronic device 120. As noted above, here the location is that of a veterinary office 114, which is one where the authorized user 113 of the electronic device 120 is unlikely to have a charger, power supply, and sufficient time to perform any meaningful charging operations for the electronic device 120. Thus, the veterinary office 114 would not be considered to be a trusted location in the context of this disclosure in this example.

Step 104 can also include a motion detector determining whether the electronic device 120 is being transported by a mode of transport that is trusted by the authorized user of the electronic device 120. One or more motion detectors of the electronic device 120 can also determine at step 104 if the electronic device 120 is in transit. This information can be of as much value as whether the electronic device 120 is situated in a trusted location due to the fact that the probability that the authorized user 113 of the electronic device 120 has a charger situated within a trusted mode of transit such as their personal car is higher than when the authorized user 113 is traveling by an untrusted mode of transit such as a public bus or train. If the authorized user 113 is transporting the electronic device 120 using, for example, a public or unknown transport facility, the probability of the authorized user 113 having a charger—and power source and time—is lower in such unknown transit operations.

Figure 9:
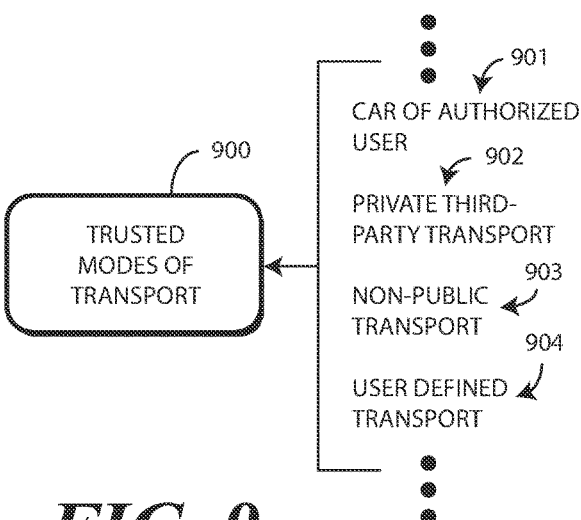
FIG. 9 illustrates examples of one or more trusted modes of transit in accordance with one or more embodiments of the disclosure.

Turning briefly to FIG. 9, illustrated therein are a few examples of trusted modes of transit 900. As with the trusted locations (800) of FIG. 8, these examples of trusted modes of transit 900 are illustrative only. Numerous other modes of transit where a user of an electronic device is sufficiently likely to have access to charging capabilities and time will be obvious to those of ordinary skill in the art having the benefit of this disclosure.

In one or more embodiments, a personal vehicle 901 belonging to an authorized user (113) of an electronic device (120) is considered to be a trusted mode of transit 900. Embodiments of the disclosure contemplate that when a person is driving or riding in a personal vehicle, it is frequently the case that they will have access to a charger equipped with a cigarette lighter adapter or universal serial bus (USB) connector capable of delivering a charging current to the energy storage device of the electronic device (120). Accordingly, a personal vehicle 901 is considered to be a trusted mode of transit 900 in one or more embodiments.

A private, third-party transport vehicle 902 can be a trusted mode of transit 900 too. Crowd-based car services where users employ foreground applications on an electronic device (120) to contract with a private contractor who uses their personal vehicle in a ride-share service can frequently be equipped with charging devices and other amenities with which a person can charge the energy storage device powering their electronic device (120) while enjoying a ride. Accordingly, in one or more embodiments a private, third-party transport vehicle 902 constitutes a trusted mode of transit 900, as can other forms of non-public transport 903. In one or more embodiments, the mode of transportation trusted by the authorized user (113) of the electronic device (120) excludes public transit services.

As with the trusted locations (800), embodiments of the disclosure allow for user-defined modes of transit 904 to be trusted modes of transit 900 as well. Illustrating by example, if a person is involved with a regular car-pool to work, they may designate the vehicles of one or more co-workers as trusted modes of transit 900 as well.

Turning now back to FIG. 1, at step 105, one or more sensors of the electronic device 120 determine whether an energy storage level of an energy storage device powering the electronic device 120 falls below a predefined threshold, one example of which is twenty percent of the energy storage capacity of the energy storage device powering the electronic device. It should be noted that the predetermined threshold can vary and can be user definable. Embodiments of the disclosure advantageously work to extend the run time of the electronic device 120 by conserving energy in the energy storage device powering the electronic device by restricting one or more non-essential services from occurring when the energy storage level of the energy storage device is below the predetermined threshold, and some users will prefer that this feature become operational when more energy remains in the energy storage device. Others will prefer to have a fully operational electronic device 120 until the energy storage device is almost depleted.

Accordingly, embodiments of the disclosure allow for a user to define the predetermined threshold to a level of their choosing. Generally speaking, however, the predetermined threshold will be between five percent and thirty percent of the energy storage capacity of the energy storage device. In other embodiments, the predetermined threshold will be predefined by a manufacturer of the electronic device 120 or will be dynamically updated via software updates that change the predetermined threshold as the energy storage capacity of the energy storage device degrades over time and from usage and charging/discharging cycling.

Decision 106 determines whether the energy storage level of the energy storage device is above, or below, the predetermined threshold. Decision 107 determines whether the electronic device 120 is being transported by a mode of transport trusted by the authorized user 113 of the electronic device. Decision 108 determines whether the electronic device 120 is situated at a location trusted by the authorized user 113 of the electronic device.

In one or more embodiments, step 104, step 105, and decisions 106,107,108 can occur in combination. For instance, in one or more embodiments step 104 and decision 108 comprise determining, with a location detector of the electronic device 120, whether the electronic device 120 is positioned at a location trusted by the authorized user 113 of the electronic device 120 when the energy storage level of the energy storage device is below the predefined threshold as determined at step 105 and decision 106. Alternatively, step 104 and decision 107 can comprise determining with a motion detector of the electronic device 120, whether the electronic device 120 is being transported by a mode of transport trusted by the authorized user 113 of the electronic device 120 when the energy storage level of the energy storage device is below the predefined threshold as determined at step 105 and decision 106.

Where the energy storage level of the energy storage device powering the electronic device 120 is above the predetermined threshold, as determined by decision 106, the electronic device 120 can continue to operate normally, which is shown illustratively in FIG. 1 with a return to normal operation at step 101. Similarly, when the electronic device 120 is situated in a location trusted by the authorized user 113 of the electronic device 120, the electronic device 120 can continue to operate normally at step 111. Moreover, when the electronic device 120 is being transported by a mode of transport trusted by the authorized user 113 of the electronic device, the electronic device 120 can also continue to operate normally at step 111. If the energy storage level of the energy storage device is near the predetermined threshold, step 112 can include prompting the authorized user 113 of the electronic device to charge the energy storage device and/or manually invoke the energy saving measures offered by embodiments of the disclosure.

By contrast, at step 109, after the one or more processors of the electronic device have determined, when the electronic device 120 is in an untrusted location or is being transported by an untrusted mode of transit, that the energy storage level of an energy storage device powering the electronic device 120 has fallen below a predetermined threshold, one example of which is twenty percent or less of the present energy storage capacity of the energy storage device, the one or more processors can initiate a battery saving protocol in running foreground applications 125 where in specific functionalities and/or services which are considered to be essential services are allowed to run. By contrast, services which are considered as non-essential and/or desired are restricted.

Said differently, in one or more embodiments at step 109 the one or more processors of the electronic device 120 restrict the one or more non-essential services (identified at step 109) of the one or more foreground applications 125 identified at step 103 from occurring when the energy storage level of the energy storage device is below the predefined threshold. As shown in FIG. 1, in one or more embodiments step 109 occurs unless the electronic device 120 is positioned at the location trusted by the authorized user 113 of the electronic device 120 or is being transported by the mode of transport trusted by the authorized user 113 of the electronic device 120.

In one or more embodiments, step 109 comprises the one or more processors identifying one or more non-essential services associated with the one or more foreground applications 125. Non-essential services can take various forms.

In one or more embodiments, the determination at step 109 that a service is "non-essential" is derived from the fact that the service being performed fails to yield resources that are immediately required by the authorized user 113 of the electronic device 120. Examples of such non-essential services include the automatic download of media contents for a foreground application 118, automatic playback options for media contents of a foreground application 118, parts of which are automatically streamed from the cloud, caller identification services that require cloud-based interactions in a foreground application 118, optional content rendering in foreground applications 125, in-application or in-media advertisements being presented in foreground applications 125, and so forth. Other examples of non-essential services will be obvious to those of ordinary skill in the art having the benefit of this disclosure.

The foreground application, service restricting, energy saving mechanism being applied at step 109 is especially beneficial for modern electronic devices due to the fact that so many applications now involve communication with one or more services across a network. These "cloud-based" applications frequently receive user input locally at the electronic device 120, transmit that user input to the "cloud" for processing, and receive results of the processing from the cloud for presentation to the authorized user 113 of the electronic device 120. While these cloud-based applications are quite popular due to the enhanced user experience they provide with lower memory requirements and on less sophisticated processors, they can be power hungry. The fact that cloud-based resources are used makes it difficult for device policies to simply turn OFF data services when the energy storage level in an energy storage device runs low.

Advantageously, step 109 automatically distinguishes between essential services and non-essential services to restrict the non-essential services when the energy storage level of the energy storage device powering the electronic device 120 drops below a predetermined threshold. In the illustrative example of FIG. 1, this applies to all identified foreground applications 125 identified at step 103. Step 109 applies the restriction only when the electronic device 120 is situated at an untrusted or unknown location or is being transported by an unknown mode to transit, to limit the times in which any services of foreground applications 125 are restricted.

Figure 5:
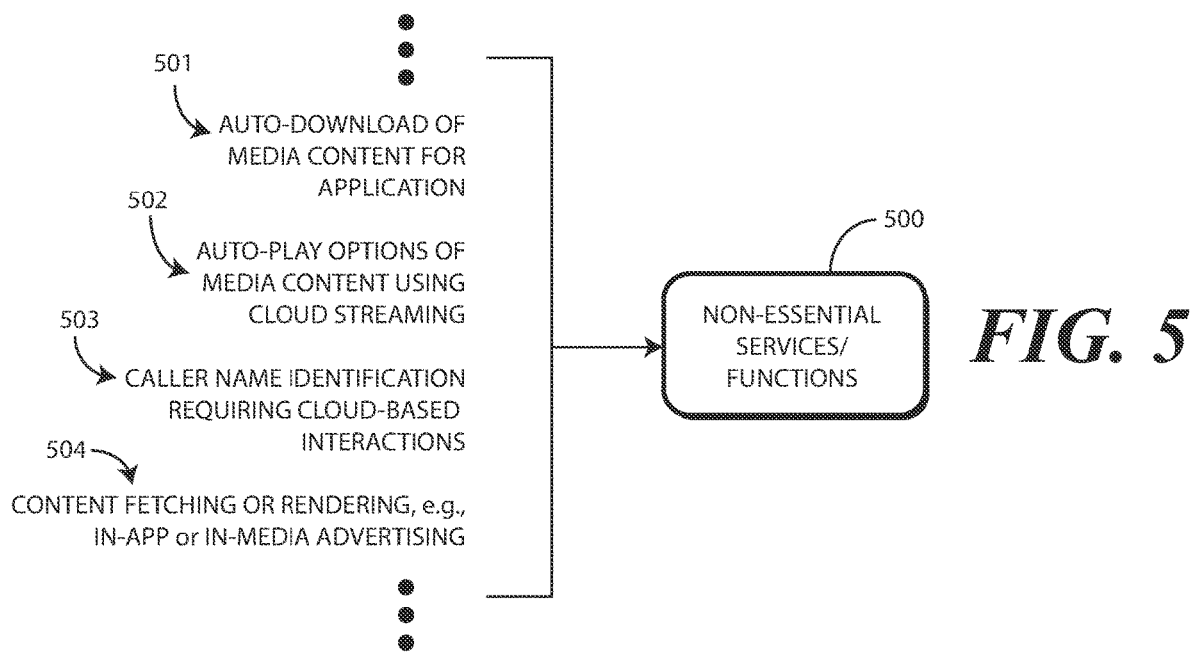
FIG. 5 illustrates one or more explanatory non-essential services or functions associated with applications capable of operating in a foreground mode in accordance with one or more embodiments of the disclosure.

Turning briefly to FIG. 5, illustrated therein are some examples of non-essential services 500 as the term is used in this disclosure. In one or more embodiments a first example of a non-essential service 500 comprises automatic downloading 501 of media content for the one or more foreground applications. In one or more embodiments, the non-essential service 500 comprises automatic downloading 501 of media content for user interactive areas of the one or more foreground applications other than a user interactive area being presented on the display of the electronic device (120).

In one or more embodiments, a second example of a non-essential service 500 comprises automatic playback 502 of media content using the one or more foreground applications. This automatic playback 502 may be considered to be a non-essential service 500 only when the automatic playback 502 utilizes a cloud server in communication with the electronic device across a network in some embodiments.

In still other embodiments, a non-essential service 500 can include caller name identification 503 by the one or more foreground applications. This caller name identification 503 may be considered to be a non-essential service 500 only when the caller name identification utilizes a cloud server in communication with the electronic device across a network in some embodiments.

In still other embodiments, the non-essential service 500 can comprise fetching or rendering 504 in the one or more foreground applications. This fetching or rendering 504 can be considered to be a non-essential service 500 only when the content rendering occurs as advertising in some embodiments.

Accordingly, turning now back to FIG. 1, in one or more embodiments the restricting the non-essential services at step 109 comprises precluding automatic downloading of media content for the one or more foreground applications 125. In one or more embodiments, the restricting the non-essential services at step 109 comprises precluding automatic playback of media content using the one or more foreground applications 125. In one or more embodiments, the restricting the non-essential services at step 109 comprises precluding the automatic playback of the media content using the one or more foreground applications 125 only when the automatic playback utilizes a cloud server in communication with the electronic device 120 across a network.

In one or more embodiments, the restricting the non-essential services at step 109 comprises precluding caller name identification by the one or more foreground applications 125. In one or more embodiments, the restricting the non-essential services at step 109 comprises precluding the caller name identification by the one or more foreground applications 125 only when the caller name identification utilizes a cloud server in communication with the electronic device 120 across a network.

In one or more embodiments, the restricting the non-essential services at step 109 comprises precluding content fetching or rendering in the one or more foreground applications 125. In one or more embodiments, the restricting the non-essential services at step 109 comprises precluding the content fetching or rendering in the one or more foreground applications 125 only when the content rendering occurs as advertising.

At step 110, one or more non-essential services 126,127, 128 of the foreground applications 117,118,119 shown at step 102 and referenced collectively as foreground applications 125 identified at step 103, have been disabled. Accordingly, the authorized user 113 can still use the messaging application of foreground application 118 to transmit the image 116 of the dog 115. However, received messages and other contents may not be automatically downloaded for other viewing until the energy storage device is recharged. Similarly, the authorized user 113 can use the image capture application of foreground application 117 to capture images 116 of the dog 115. However, those images may only be stored locally and not uploaded to the cloud until the energy storage device is recharged. Likewise, the authorized user 113 may be able to use the audio capture application of foreground application 119 to dictate text, but not to upload audio files to the cloud, and so forth. Advantageously, embodiments of the disclosure work to extend battery life by restricting operations of foreground applications 125 that are not essential but that are generally executed automatically anyway.

The method 100 of FIG. 1 is distinct from prior art solutions at extending batter life because prior art power saving techniques are not applicable to foreground applications 125. While background applications 121,122,123 may be restricted or terminated, and while device features may be limited when the energy in an energy storage device is low, there has historically been a presumption that the user of a device is aware of the status of the battery when interacting with a foreground application.

Embodiments of the disclosure contemplate that when an authorized user 113 of the electronic device 120 is interacting with a foreground application 125 some unintended functionality will automatically execute via services of the foreground application 125. Such functionality occurs despite any prior art battery saver mode being enabled. One example of such a function includes the automatic downloading of messages and media in messaging applications. This automatic downloading, which allows a user to view the messages and media at a later time without downloading delays, generally occurs independently of any consideration of energy storage levels in an energy storage device. Other examples of such functions include the automatic playback of videos in messaging and multimedia applications, the automatic delivery of advertisements in games, multimedia applications, web browsers, and other similar applications, and so forth.

Advantageously, the method 100 of FIG. 1 provides a solution to this problem. As illustrated, one or more sensors of the electronic device 120 detect an energy storage level of an energy storage device powering the electronic device 120 falling below a predefined threshold. A location detector and a motion detector then determine whether the electronic device 120 is positioned at a location trusted by the authorized user 113 of the electronic device 120 when the energy storage level of the energy storage device is below the predefined threshold or the electronic device 120 is being transported by a mode of transport trusted by the authorized user 113 of the electronic device when the energy storage level of the energy storage device is below the predefined threshold.

One or more processors of the electronic device 120 then identify one or more foreground applications 125 operating on the electronic device 120. The one or more processors also identify one or more non-essential services 126,127,128 associated with the one or more foreground applications 125 operating on the electronic device 120. In one or more embodiments, the one or more processors restrict the one or more non-essential services 126,127,128 from occurring when the energy storage level of the energy storage device is below the predefined threshold unless the electronic device 120 is positioned at the location trusted by the authorized user 113 of the electronic device 120 or is being transported by the mode of transport trusted by the authorized user 113 of the electronic device 120.

Figure 6:
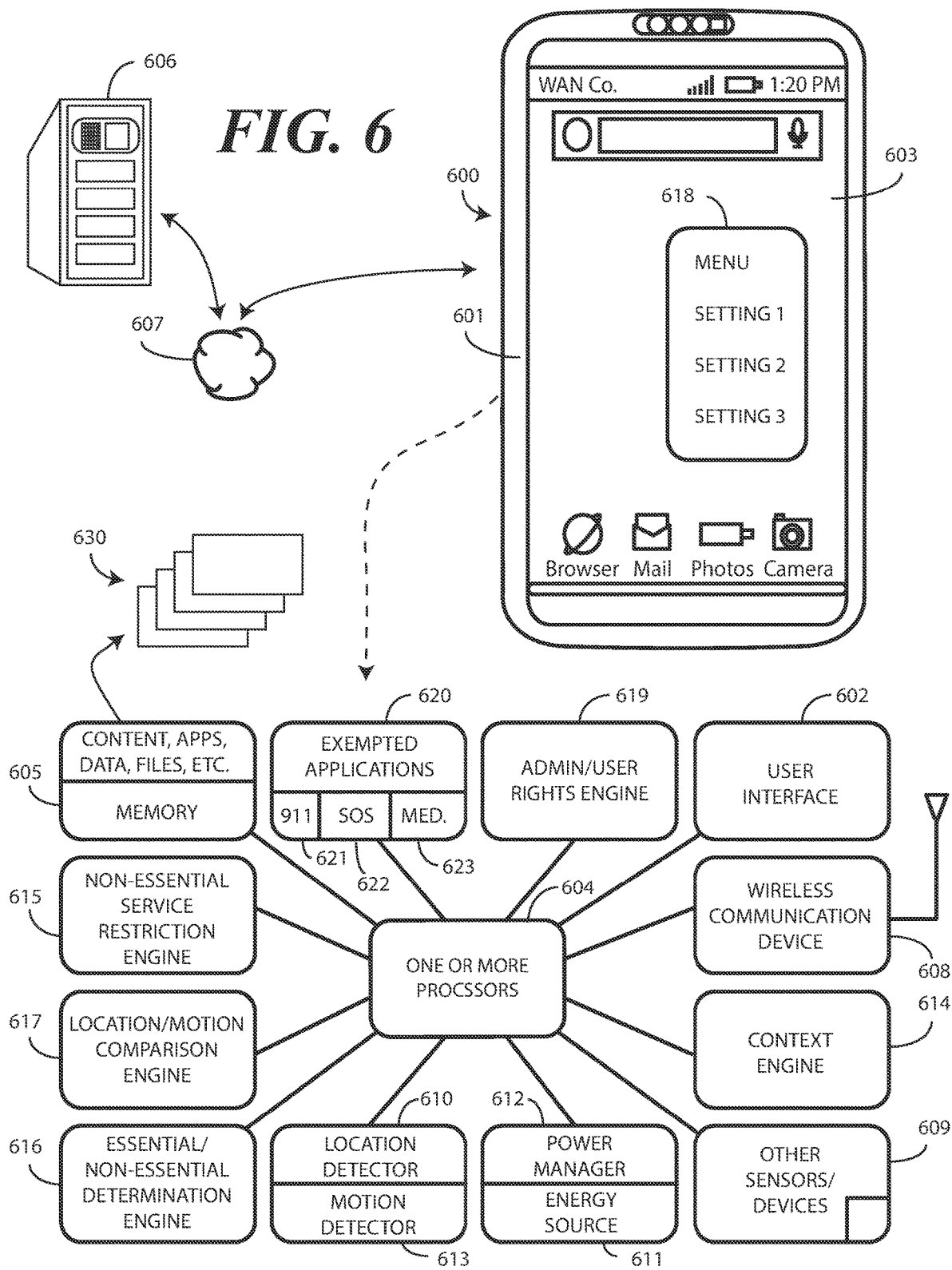
FIG. 6 illustrates one explanatory electronic device in accordance with one or more embodiments of the disclosure.

Turning now to FIG. 6, illustrated therein is another explanatory electronic device 600 configured in accordance with one or more embodiments of the disclosure. Also illustrated in FIG. 6 is schematic block diagram for the electronic device 600. It should be noted that the electronic device 600, while shown as a smartphone for illustrative purposes in FIG. 6, can be any of a number of various types of devices. It will be obvious to those of ordinary skill in the art having the benefit of this disclosure that the block diagram schematic of FIG. 6 could be adapted for use with other devices as well, including palm-top computers, tablet computers, gaming devices, media players, wearable devices, or other devices.

In one or more embodiments, the components of the block diagram schematic are configured as a printed circuit board assembly disposed within a housing 601 of the electronic device 600. Various components can be electrically coupled together by conductors or a bus disposed along one or more printed circuit boards.

The illustrative block diagram schematic of FIG. 6 includes many different components. Embodiments of the disclosure contemplate that the number and arrangement of such components can change depending on the particular application. Accordingly, electronic devices configured in accordance with embodiments of the disclosure can include some components that are not shown in FIG. 6, and other components that are shown may not be needed and can therefore be omitted.

The illustrative block diagram schematic includes a user interface 602. In one or more embodiments, the user interface 602 includes a display 603. Where included the display 603 may optionally be touch-sensitive. In one or more embodiments, users can deliver user input to the display 603 of such an embodiment by delivering touch input from a finger, stylus, or other objects disposed proximately with the display 603. In one embodiment, the display 603 is configured as an active-matrix organic light emitting diode (AMOLED) display. However, it should be noted that other types of displays, including liquid crystal displays, suitable for use with the user interface 602 would be obvious to those of ordinary skill in the art having the benefit of this disclosure.

In one embodiment, the electronic device includes one or more processors 604. The one or more processors 604 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic. Each of the application processor and the auxiliary processor(s) can be configured to process and execute executable software code to perform the various functions of the electronic device with which the block diagram schematic operates. A storage device, such as memory 605, can optionally store the executable software code used by the one or more processors 604 during operation.

Applications 630 operable on the one or more processors 604 can be stored in the memory 605. As noted above, applications with user interactable areas being presented with sufficient area on the display 603 such that a user can interactively engage the user interactable areas can be considered by the one or more processors 604 to be foreground applications. Other applications actively operating on the one or more processors 604 but not meeting these criteria can be considered to be background applications. Either foreground applications or background applications can engage, in their active operations, a cloud server 606 across a network 607. The applications 630 may communicate with the cloud server 606 across the network 607 to retrieve files, data, media content, e.g., pictures, videos, sounds, screenshots, etc., or combinations thereof.

In this illustrative embodiment, the block diagram schematic also includes a communication device 608 that can be configured for wired or wireless communication with one or more other devices or networks. The networks can include a wide area network, a local area network, and/or personal area network. The communication device 608 may also utilize wireless technology for communication, such as, but are not limited to, peer-to-peer or ad hoc communications such as HomeRF, Bluetooth, and IEEE 802.11, as well as other forms of wireless communication such as infrared technology. The communication device 608 can include wireless communication circuitry, one of a receiver, a transmitter, or transceiver, and one or more antennas.

In one embodiment, the one or more processors 604 can be responsible for performing the primary functions of the electronic device with which the block diagram schematic is operational. For example, in one embodiment the one or more processors 604 comprise one or more circuits operable with the user interface 602 to present presentation information to a user. The executable software code used by the one or more processors 604 can be configured as one or more modules that are operable with the one or more processors 604. Such modules can store instructions, control algorithms, and so forth.

In one or more embodiments, the block diagram schematic includes one or more sensors 609. For example, in one or more embodiments the electronic device 600 includes a location detector 610. In one embodiment, location detector 610 is able to determine location data indicating whether the electronic device 600 is situated at a trusted location where an authorized user of the electronic device 600 is likely to have a charging device, a power source, and sufficient time to meaningfully charge the energy storage device 611 of the electronic device 600. In one or more embodiments, the location detector 610 determines whether the electronic device 600 is positioned at a location trusted by an authorized user of the electronic device 600 when the power manager 612 determines that an energy storage level of the energy storage device 611 is below a predefined threshold such as twenty percent or less. Said differently, in one or more embodiments the location detector 610 determines whether the electronic device 600 is in a location trusted by an authorized user of the electronic device 600 when the power manager 612 determines the energy storage level to be below the predefined threshold.

The location detector 610 can determine the location of the electronic device 600 in a variety of ways, including by capturing the location data from a constellation of one or more earth orbiting satellites, or from a network of terrestrial base stations to determine an approximate location. In one or more embodiments, the satellite positioning systems-based location fixes of the location detector 610 autonomously or with assistance from terrestrial base stations, for example those associated with a cellular communication network or other ground-based network, or as part of a Differential Global Positioning System (DGPS), as is well known by those having ordinary skill in the art. The location detector 610 may also be able to determine location by locating or triangulating terrestrial base stations of a traditional cellular network, or from other local area networks, such as Wi-Fi networks.

The one or more sensors 609 can also include a motion detector 613. The motion detector 613 can determine when the electronic device 600 moves and/or when movement of the electronic device 600 is determined to exceed a predefined threshold. The motion detector 613 can also be configured as an orientation detector that determines an orientation and/or movement of the electronic device 600 in three-dimensional space. Illustrating by example, the motion detector 613 can include an accelerometer, gyroscopes, or other device to detect device orientation and/or motion of the electronic device 600. Using an accelerometer as an example, an accelerometer can be included to detect motion of the electronic device 600. Additionally, the accelerometer can be used to sense some of the gestures of the user, such as one talking with their hands, running, or walking.

The motion detector 613 can also determine the spatial orientation of an electronic device 600 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 600.

A context engine 614 can be operable with the one or more sensors 609 to detect, infer, capture, and otherwise determine persons, locations, modes of transit, and actions that are occurring in an environment about the electronic device 600. For example, where included one embodiment of the context engine 614 determines assessed contexts and frameworks using adjustable algorithms of context assessment employing information, data, locations, and events. These assessments may be learned through repetitive data analysis.

These assessments can be used to, for example, determine whether the electronic device is positioned at a location trusted by an authorized user of the electronic device when the energy storage level of the energy storage device is below the predefined threshold or whether the electronic device is being transported by a mode of transport trusted by the authorized user of the electronic device when the energy storage level of the energy storage device is below the predefined threshold. Alternatively, a user may employ the user interface 602 to enter various parameters, constructs, rules, and/or paradigms that instruct or otherwise guide the context engine 614 in detecting locations, modes of transit, proximity of companion devices such as charging devices, and other contextual information that can be used by a non-essential service restriction engine 615 to restrict, in response to the location detector 610 failing to determine the electronic device 600 is in a location trusted by an authorized user when the power manager 612 determines whether the energy storage level of the energy storage device 611 is below the predefined threshold, one or more non-essential services identified by an essential/non-essential services determination engine 616 of one or more foreground applications operating on the one or more processors 604. The context engine 614 can also assist the non-essential service restriction engine 615 in restricting, in response to the motion detector 613 failing to determine the electronic device 600 is being transported by the mode of transportation trusted by the authorized user when the power manager 612 determines whether the energy storage level of the energy storage device 611 is below the predefined threshold, one or more non-essential services identified by an essential/non-essential services determination engine 616 of one or more foreground applications operating on the one or more processors 604 as well. The context engine 614 can comprise an artificial neural network or other similar technology in one or more embodiments.

In one or more embodiments, the context engine 614, the essential/non-essential services determination engine 616, the non-essential service restriction engine 615, and the location/motion comparison engine 617 that determines whether the electronic device 600 is in a trusted location or being moved by a trusted mode of transport are each operable with the one or more processors 604. In some embodiments, the one or more processors 604 can control the context engine 614, the essential/non-essential services determination engine 616, the non-essential service restriction engine 615, and the location/motion comparison engine 617. In other embodiments, the context engine 614, the essential/non-essential services determination engine 616, the non-essential service restriction engine 615, and the location/motion comparison engine 617 can each operate independently, delivering information gleaned from the one or more sensors 609, the context engine 614, and other contextual information to the one or more processors 604. The context engine 614, the essential/non-essential services determination engine 616, the non-essential service restriction engine 615, and the location/motion comparison engine 617 can each receive data from the various sensors 609. In one or more embodiments, the one or more processors 604 are configured to perform the operations of one or more of the context engine 614, the essential/non-essential services determination engine 616, the non-essential service restriction engine 615, and the location/motion comparison engine 617.

The one or more processors 604 of the electronic device 600 can optionally present a menu 618 with one or more control settings that allow a user possessing administrative login credentials authenticated by an administrative rights engine 619 to define, for example, various user-defined locations (803) and/or user-defined trusted modes of transit (904) as previously described. In one or more embodiments, the user-defined locations (803) and/or user-defined trusted modes of transit (904) are user definable using the one or more control settings of the menu 618 presented on the display 603. Additionally, in one or more embodiments a user can define what services of the various applications 630 are to be considered non-essential services by the essential/non-essential service determination engine 616 using the menu 618 presented on the display 603. If, for example, a user wants automatic downloads of multimedia content to be considered a non-essential service, but wants automatic downloads of static media content to be considered an essential service, the user can define the same using the one or more control settings of the menu 618 presented on the display 603.

Embodiments of the disclosure contemplate that the electronic device 600 may move while the non-essential service restriction engine 615 is restricting the one or more non-essential services from occurring when the energy storage level of the energy storage device is below the predefined threshold. For example, the electronic device 600 may move from an untrusted location or untrusted mode of transit to a location that is trusted by the authorized user of the electronic device 600 or to a mode of transport that is trusted by the authorized user of the electronic device 600. In one or more embodiments, the location detector 610 and/or motion detector 613 are operable, in conjunction with the one or more processors 604, to monitor such changes in location. The location/motion comparison engine 617 can compare, for example, the location when the non-essential service restriction engine 615 began restricting the one or more non-essential services from occurring when the energy storage level of the energy storage device is below the predefined threshold to a current location. In one or more embodiments, when the location/motion comparison engine 617 determines that the operating location has transitioned either to the location trusted by the authorized user of the electronic device 600 or to a mode of transport trusted by the authorized user of the electronic device 600. In one or more embodiments, when this occurs the non-essential service restriction engine 615 can cease restriction of the non-essential services when the electronic device 600 becomes situated at the location trusted by the authorized user of the electronic device 600. Alternatively, the non-essential service restriction engine 615 can cease restriction of the non-essential services when it is determined that the electronic device 600 is being transported by a mode of transit that is trusted by the authorized user of the electronic device 600. In so doing, the location/motion comparison engine 617 is able to continually determine when the electronic device 600 moves, thereby allowing the one or more processors 604 to cause the non-essential service restriction engine 615 to restrict and/or cease restriction of the non-essential services as a function of the operating location of the electronic device 600.

Figure 10:
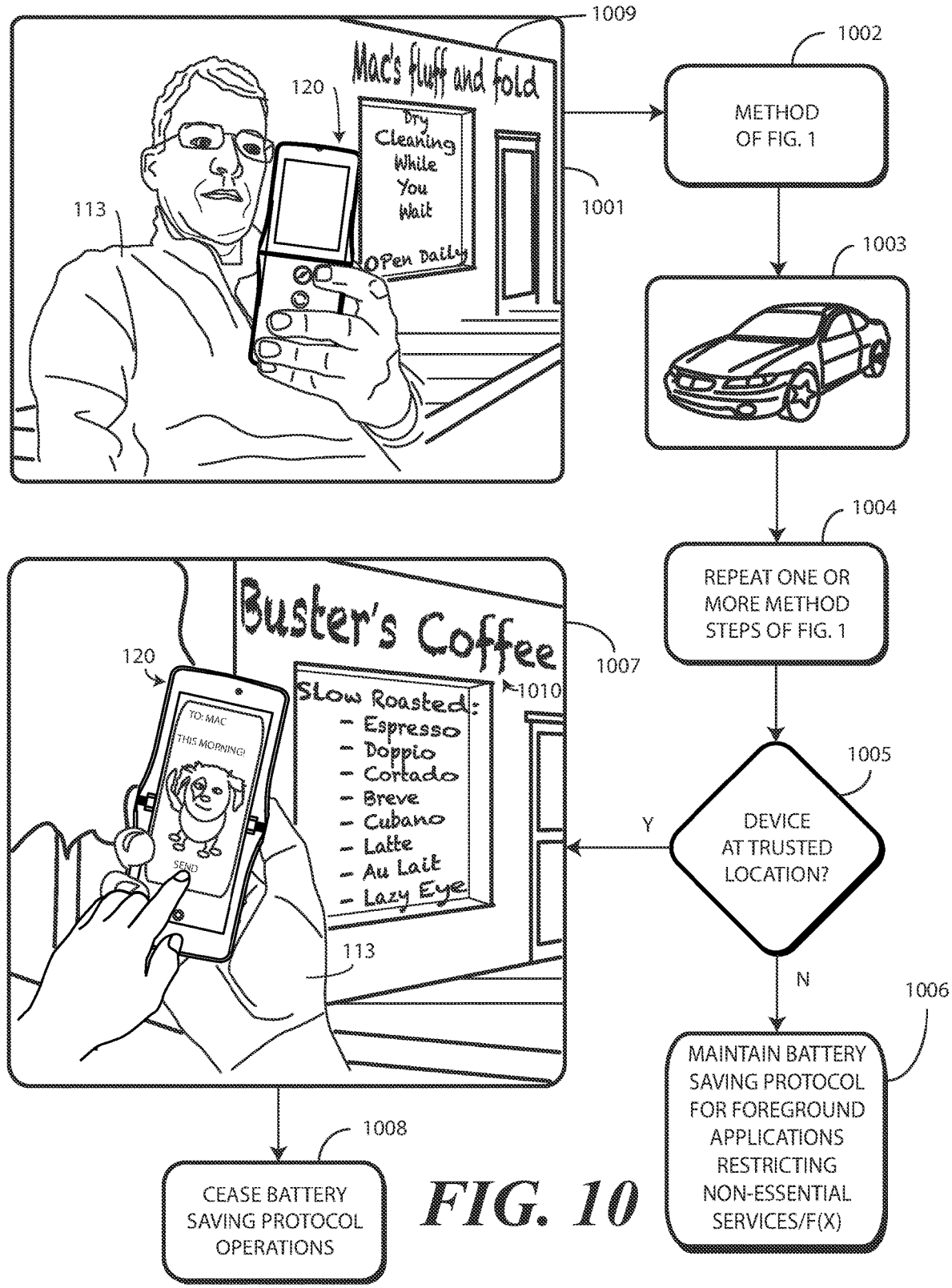
FIG. 10 illustrates another explanatory method in accordance with one or more embodiments of the disclosure.

Turning briefly to FIG. 10, illustrated therein is one method depicting how this location-based application of the restriction and/or cessation of the restriction of non-essential services as a function of the operating location of an electronic device 120 can occur. Beginning at step 1001, an authorized user 113 of the electronic device 120 is interacting one or more foreground applications operating on one or more processors of the electronic device 120 while situated at an untrusted location 1009.

At step 1002, the method (100) of FIG. 1 is generally performed as previously described. Specifically, one or more sensors detect an energy storage level of an energy storage device powering the electronic device 120 falling below a predefined threshold. Using one or both of a location detector and/or a motion detector, these sensors determine whether the electronic device 120 is positioned at a location trusted by the authorized user 113 of the electronic device 120 when the energy storage level of the energy storage device is below the predefined threshold and/or whether the electronic device 120 is being transported by a mode of transport trusted by the authorized user 113 of the electronic device 120 when the energy storage level of the energy storage device is below the predefined threshold.

The one or more processors then identify one or more foreground applications operating on the electronic device 120. The one or more processors also identify one or more non-essential services associated with the one or more foreground applications operating on the electronic device. In this example, since the authorized user 113 of the electronic device 120 is at an untrusted location when step 1002 is performed, the one or more processors restrict the one or more non-essential services from occurring when the energy storage level of the energy storage device is below the predefined threshold. This occurs because the electronic device is neither positioned at the location trusted by the authorized user 113 of the electronic device 120 nor is being transported by the mode of transport trusted by the authorized user 113 of the electronic device 120.

At step 1003 the authorized user 113 moves the electronic device 120. At step 1004, one or more steps of the method (100) of FIG. 1 can be repeated. Illustrating by example, step 1004 can include a location comparison engine or other component of the electronic device 120 determining that the operating location has transitioned either to a location trusted by the authorized user 113 of the electronic device 120 or to a mode of transport trusted by the authorized user 113 of the electronic device 120. This change of location is confirmed at decision 1005.

At step 1007, the authorized user 113 of the electronic device 120 is now at a trusted location, which is Buster's Coffee Shop. The authorized user 113 has set up Buster's Coffee Shop as a user-defined location (803) because Buster is generous with both the use of spare charging devices and wall outlets. Plus, Buster's coffee, which is served at a big, beautiful bar, is absolutely delicious. Accordingly, at step 1008 a non-essential service restriction engine or other component of the electronic device 120 can cease restriction of the non-essential services when the electronic device 120 becomes situated at the location 1010 trusted by the authorized user 113 of the electronic device 120. By contrast, as long as the electronic device 120 remains at an untrusted location or in an untrusted mode of transit, the restriction operations can continue at step 1006.

Figure 7:
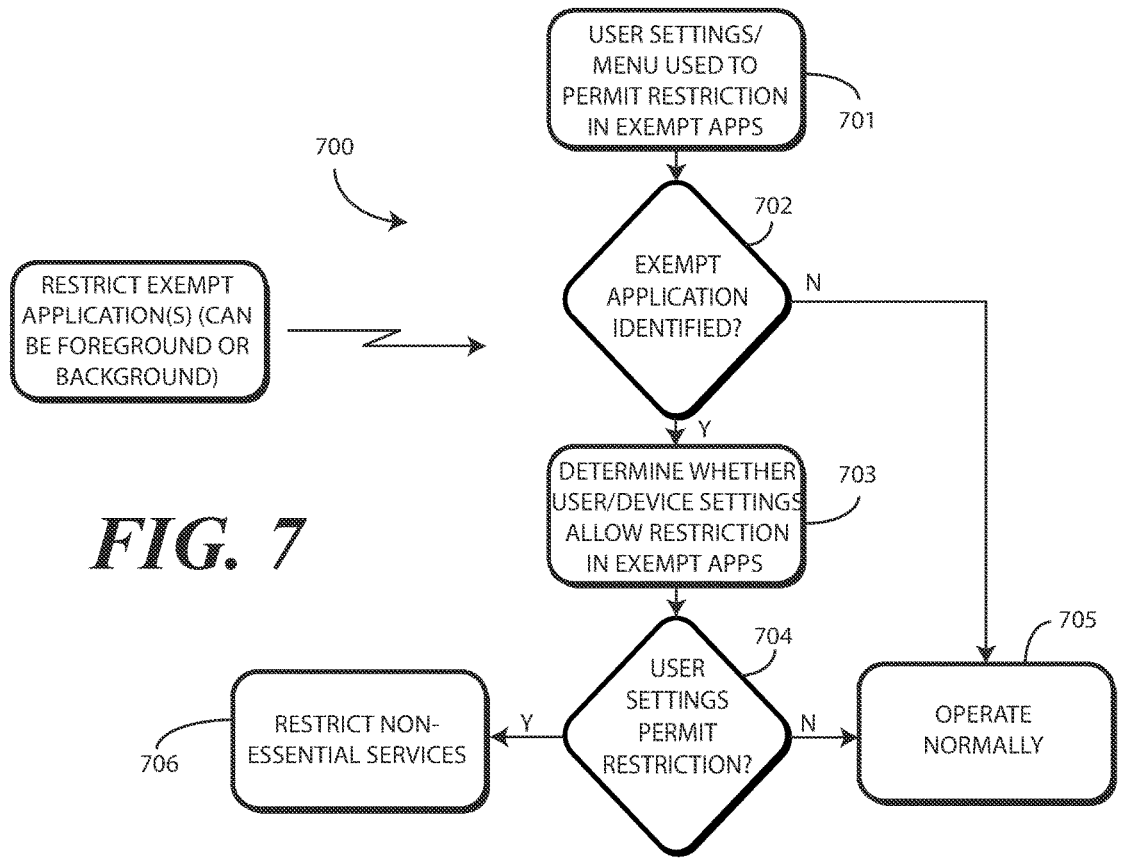
FIG. 7 illustrates one or more explanatory method steps in accordance with one or more embodiments of the disclosure.

Turning now back to FIG. 6, an alternate feature offered by embodiments of the disclosure will be described. While the memory 605 can store many applications 630, embodiments of the disclosure contemplate that the one or more processors 604 may include one or more exempted applications 620 to which energy saving techniques such as restricting non-essential services are generally not permitted. Examples of such exempted applications 620 include an emergency services dispatch application 621, an emergency services notification application 622, and a medical alert application 623. While these exempted applications 620 are generally not allowed to be manipulated to save energy in the energy storage device 611, using embodiments of the disclosure when an authorized user of the electronic device 600 is properly authenticated by the administration rights engine 619, certain non-essential services of these exempted applications 620 can be disabled as well when the energy storage level of the energy storage device 611 is below the predefined threshold unless the electronic device 600 is positioned at the location trusted by the authorized user of the electronic device 600 or is being transported by the mode of transport trusted by the authorized user of the electronic device 600. Turning now to FIG. 7, illustrated therein is one method 700 depicting how this can occur.

Beginning at step 701, one or more processors (604) of the electronic device (600) present one or more user settings allowing the restriction of non-essential services in exempt applications (620). Decision 702 determines whether any exempted applications (620) are operating on the one or more processors (604) of the electronic device (600). If not, the electronic device (600) simply operates in accordance with the method (100) of FIG. 1 at step 705.

If exempted applications (620) are operating on the one or more processors (604), decision 704 determines whether a user is sufficiently authorized or has sufficient permission levels to cause the restriction of non-essential services in exempted applications (620) has applied those settings allowing restrictions of the same. If not, the electronic device (600) simply operates in accordance with the method (100) of FIG. 1 at step 705. Otherwise, when the one or more foreground applications or the one or more background applications comprise at least one exempted application (620), at step 706 the one or more processors restrict the one or more non-essential services from occurring when the energy storage level of the energy storage device (611) is below the predefined threshold. In one or more embodiments, step 706 only occurs when one or more user settings of the electronic device (600), set by an authorized user having sufficient permission, permit non-essential service restriction in the at least one exempted application, e.g., the emergency services dispatch application (621).

Figure 11:
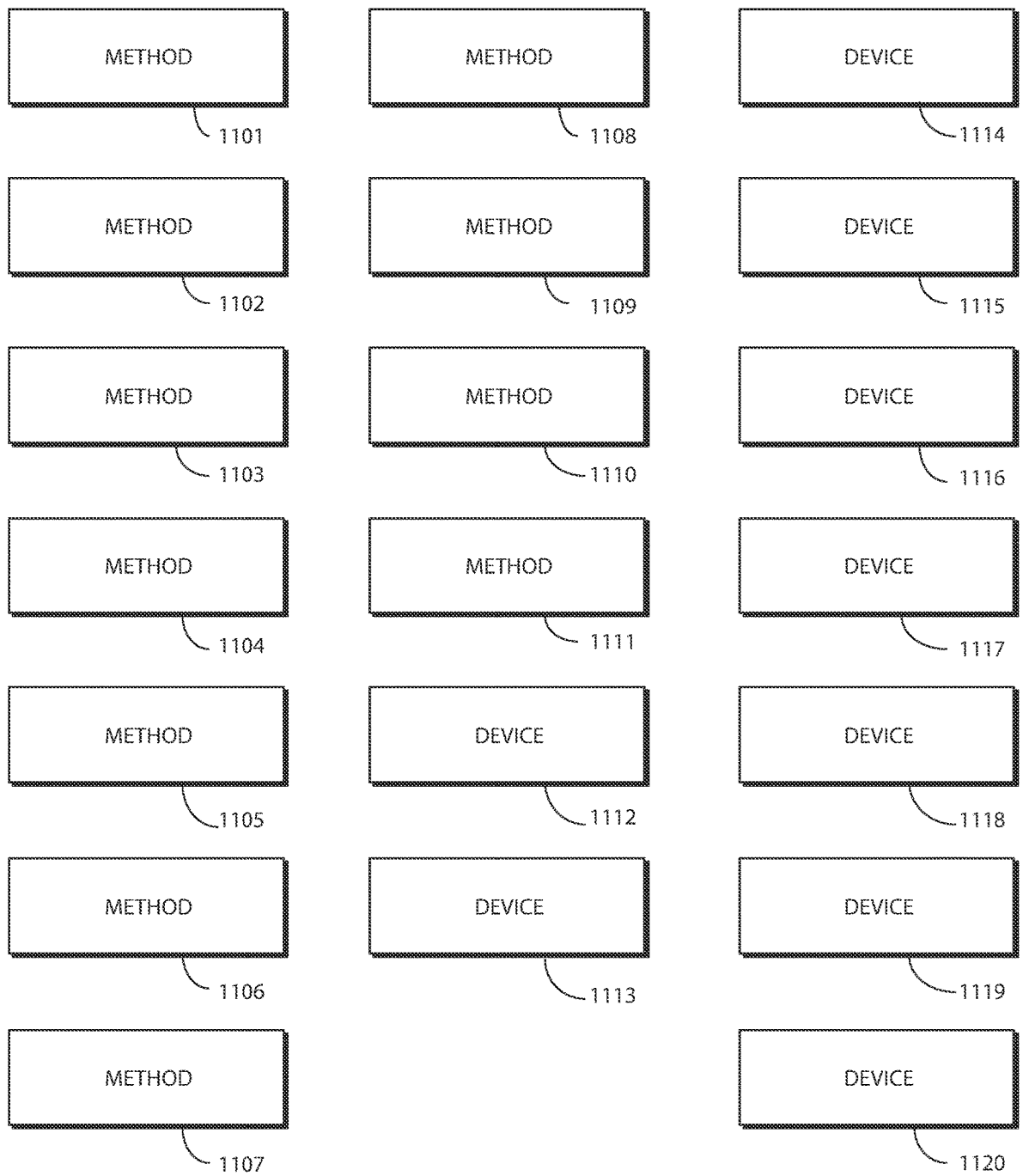
FIG. 11 illustrates various embodiments of the disclosure.

Turning now to FIG. 11, illustrated therein are various embodiments of the disclosure. Since each of the elements included with these embodiments has been illustrated and described above, for brevity the particular configurations recited in FIG. 11 will be illustrated with a labeled representation, which in this case is a labeled rectangular box. Since all the details of each embodiment has been sufficiently illustrated and described above, their repeated illustration in FIG. 11 is no longer essential for a proper understanding of each embodiment.

At 1101, a method in an electronic device comprises detecting, with one or more sensors, an energy storage level of an energy storage device powering the electronic device falling below a predefined threshold. At 1101, the method comprises determining, with a location detector and a motion detector, whether the electronic device is positioned at a location trusted by an authorized user of the electronic device when the energy storage level of the energy storage device is below the predefined threshold or the electronic device is being transported by a mode of transport trusted by the authorized user of the electronic device when the energy storage level of the energy storage device is below the predefined threshold.

At 1101, the method comprises identifying, by one or more processors, one or more foreground applications operating on the electronic device. At 1101, the method also comprises identifying, by the one or more processors, one or more non-essential services associated with the one or more foreground applications operating on the electronic device.

At 1101, the method comprises restricting the one or more non-essential services from occurring when the energy storage level of the energy storage device is below the predefined threshold. In one or more embodiments, this occurs unless the electronic device is positioned at the location trusted by the authorized user of the electronic device or is being transported by the mode of transport trusted by the authorized user of the electronic device.

At 1102, the identifying the one or more foreground applications of 1101 comprises determining whether a user interactable area of an active application is available on a user interface of the electronic device. At 1103, the identifying the one or more foreground applications of 1102 further comprises determining whether a user interactive area of the active application exceeds a predefined area of the user interface of the electronic device.

At 1104, the restriction the non-essential services of 1101 comprises precluding automatic downloading of media content for the one or more foreground applications. At 1105, the restriction of the non-essential services of 1101 comprises precluding automatic playback of media content using the one or more foreground applications. At 1106, the restriction of the non-essential services of 1105 comprises precluding the automatic playback of the media content using the one or more foreground applications only when the automatic playback utilizes a cloud server in communication with the electronic device across a network.

At 1107, the restriction of the non-essential services of 1101 comprises precluding caller name identification by the one or more foreground applications. At 1108, the restriction of the non-essential services of 1107 comprises precluding the caller name identification by the one or more foreground applications only when the caller name identification utilizes a cloud server in communication with the electronic device across a network.

At 1109, the restriction of the non-essential services of 1101 comprises precluding content rendering in the one or more foreground applications. At 1110, the restriction of the non-essential services of 1109 comprises precluding the content rendering in the one or more foreground applications only when the content rendering occurs as advertising.

At 1111, electronic device of of 1101 further comprises at least one exempted application. At 1111, the restriction of the one or more non-essential services from occurring when the energy storage level of the energy storage device is below the predefined threshold occurs only when one or more user settings of the electronic device permit non-essential service restriction in the at least one exempted application.

At 1112, an electronic device comprises an energy storage device powering the electronic device. At 1112, the electronic device comprises a power manager determining whether an energy storage level of the energy storage device is below a predefined threshold.

At 1112, the electronic device comprises a location detector determining whether the electronic device is in a location trusted by an authorized user of the electronic device when the power manager determines the energy storage level to be below the predefined threshold. At 1112, the electronic device comprises one or more processors restricting, in response to the location detector failing to determine the electronic device is in the location trusted by the authorized user when the power manger determines whether the energy storage level of the energy storage device is below the predefined threshold, one or more non-essential services of one or more foreground applications operating on the one or more processors.

At 1113, the location trusted by the authorized user of the electronic device at 1112 comprises one of a residence of the authorized user or a workplace where the authorized user is employed. At 1114, the electronic device of 1113 further comprises a display. At 1114, the one or more non-essential services comprise automatic downloading of media content for user interactive areas of the one or more foreground applications other than a user interactive area being presented on the display.

At 1115, the one or more non-essential services of 1113 comprise downloads of media content from a cloud server across a network. At 1116, the one or more processors of 1113 cease restriction of the non-essential services when the electronic device becomes situated at the location trusted by the authorized user of the electronic device.

At 1117, an electronic device comprises an energy storage device powering the electronic device. At 1117, the electronic device comprises a power manager determining whether an energy storage level of the energy storage device is below a predefined threshold.

At 1117, the electronic device comprises a motion detector determining whether the electronic device is being transported by a mode of transportation trusted by an authorized user of the electronic device when the power manager determines the energy storage level to be below the predefined threshold. At 1117, the electronic device comprises one or more processors restricting, in response to the motion detector failing to determine the electronic device is being transported by the mode of transportation trusted by the authorized user when the power manger determines whether the energy storage level of the energy storage device is below the predefined threshold, one or more non-essential services of one or more foreground applications operating on the one or more processors.

At 1118, the mode of transportation trusted by the authorized user of the electronic device of 1117 excludes public transit services. At 1119, the predefined threshold of 1118 comprises twenty percent or less of an energy storage capacity of the energy storage device. At 1120, the one or more non-essential services of 1117 comprise one or both of automatic downloading operations by the one or more foreground applications and/or automatic playback operations by the one or more foreground applications.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more sensors, an energy storage level of an energy storage device powering the electronic device falling below a predefined threshold;
    determining, with a location detector and a motion detector, whether:
        the electronic device is positioned at a location trusted by an authorized user of the electronic device when the energy storage level of the energy storage device is below the predefined threshold; or
        the electronic device is being transported by a mode of transport trusted by the authorized user of the electronic device when the energy storage level of the energy storage device is below the predefined threshold;
    identifying, by one or more processors, one or more foreground applications operating on the electronic device by determining whether a user interactive area of an active application exceeds a predefined area of a user interface of the electronic device;
    also identifying, by the one or more processors, one or more non-essential services associated with the one or more foreground applications operating on the electronic device; and
    restricting the one or more non-essential services from occurring when the energy storage level of the energy storage device is below the predefined threshold unless the electronic device is positioned at the location trusted by the authorized user of the electronic device or is being transported by the mode of transport trusted by the authorized user of the electronic device.

2. The method of claim 1, wherein the identifying the one or more foreground applications comprises determining whether a user interactable area of the active application is available on a user interface of the electronic device.

3. The method of claim 2, wherein the predefined area of the user interface of the electronic device is greater than a thumbnail or icon-shaped user interaction area of the active application.

4. The method of claim 1, wherein the restricting the non-essential services comprises precluding automatic downloading of media content for the one or more foreground applications.

5. The method of claim 1, wherein the restricting the non-essential services comprises precluding automatic playback of media content using the one or more foreground applications.

6. The method of claim 5, wherein the restricting the non-essential services comprises precluding the automatic playback of the media content using the one or more foreground applications only when the automatic playback utilizes a cloud server in communication with the electronic device across a network.

7. The method of claim 1, wherein the restricting the non-essential services comprises precluding caller name identification by the one or more foreground applications.

8. The method of claim 7, wherein the restricting the non-essential services comprises precluding the caller name identification by the one or more foreground applications only when the caller name identification utilizes a cloud server in communication with the electronic device across a network.

9. The method of claim 1, wherein the restricting the non-essential services comprises precluding content rendering in the one or more foreground applications.

10. The method of claim 9, wherein the restricting the non-essential services comprises precluding the content rendering in the one or more foreground applications only when the content rendering occurs as advertising.

11. The method of claim 1, further comprising at least one exempted application, wherein the restricting the one or more non-essential services from occurring when the energy storage level of the energy storage device is below the predefined threshold occurs only when one or more user-defined device settings of the electronic device permit non-essential service restriction in the at least one exempted application.

12. An electronic device, comprising:
an energy storage device powering the electronic device;
a power manager determining whether an energy storage level of the energy storage device is below a predefined threshold;
a location detector determining whether the electronic device is in a location trusted by an authorized user of the electronic device when the power manager determines the energy storage level to be below the predefined threshold; and
one or more processors restricting, in response to the location detector failing to determine the electronic device is in the location trusted by the authorized user when the power manager determines whether the energy storage level of the energy storage device is below the predefined threshold, one or more non-essential services of one or more foreground applications operating on the one or more processors; and
thereafter, ceasing restriction of the non-essential services when the electronic device becomes situated at the location trusted by the authorized user of the electronic device.

13. The electronic device of claim 12, wherein the location trusted by the authorized user of the electronic device comprises one of a residence of the authorized user or a workplace where the authorized user is employed.

14. The electronic device of claim 13, further comprising a display, wherein the one or more non-essential services comprise automatic downloading of media content for user interactive areas of the one or more foreground applications other than a user interactive area being presented on the display.

15. The electronic device of claim 13, wherein the one or more non-essential services comprise downloads of media content from a cloud server across a network.

16. The electronic device of claim 13, the one or more processors further ceasing restriction of the non-essential services when the electronic device is being transported by a mode of transit that is trusted by the authorized user of the electronic device.

17. An electronic device, comprising:
an energy storage device powering the electronic device;
a power manager determining whether an energy storage level of the energy storage device is below a predefined threshold;
a motion detector determining whether the electronic device is being transported by a mode of transportation trusted by an authorized user of the electronic device when the power manager determines the energy storage level to be below the predefined threshold; and
one or more processors restricting, in response to the motion detector failing to determine the electronic device is being transported by the mode of transportation trusted by the authorized user when the power manger determines whether the energy storage level of the energy storage device is below the predefined threshold, one or more non-essential services of one or more foreground applications operating on the one or more processors.

18. The electronic device of claim 17, wherein the mode of transportation trusted by the authorized user of the electronic device excludes public transit services.

19. The electronic device of claim 18, wherein the predefined threshold comprises twenty percent or less of an energy storage capacity of the energy storage device.

20. The electronic device of claim 17, wherein the one or more non-essential services comprise one or both of automatic downloading operations by the one or more foreground applications and/or automatic playback operations by the one or more foreground applications.

* * * * *